United States Patent [19]  
Schneider et al.

[11] 4,186,829  
[45] Feb. 5, 1980

[54] MODULATABLE POWER TRANSMISSION CLUTCH

[75] Inventors: Raymond C. Schneider; Paul A. Pelligrino, both of Rockford, Ill.

[73] Assignee: Twin Disc, Incorporated, Racine, Wis.

[21] Appl. No.: 850,961

[22] Filed: Nov. 14, 1977

[51] Int. Cl.² ............................................. F16D 25/00
[52] U.S. Cl. ........................... 192/109 F; 192/85 AA
[58] Field of Search ........... 192/109 F, 85 AA, 87.17, 192/87.12

[56] References Cited

U.S. PATENT DOCUMENTS

| | | | |
|---|---|---|---|
| 2,916,122 | 12/1959 | Hindmarch | 192/109 F |
| 2,979,176 | 4/1961 | Voth | 192/87.17 |
| 3,106,999 | 10/1963 | Snoy | 192/87.17 |
| 3,265,175 | 8/1966 | Crosswhite | 192/109 F |
| 3,472,350 | 10/1969 | Overson | 192/109 F |
| 4,070,926 | 1/1978 | Schneider et al. | 192/109 F |

Primary Examiner—Benjamin Wyche  
Attorney, Agent, or Firm—James E. Nilles

[57] ABSTRACT

A modulatable power transmission clutch has a rotatable driving member, a rotatable driven member, and slippingly engagable clutch plates between said members which are movable into engagement by a fluid-applied spring-released movable piston having two separate fluid application areas thereon, with one area being larger than the other. Fluid is supplied directly to the smaller piston area by an operator-controlled proportional solenoid valve to regulate clutch modulation. Fluid flow to the larger piston area is controlled by a spring-biased trigger valve which pops open when fluid pressure to the smaller piston area reaches a predetermined level, to thereby effect maximum clutch engagement. The trigger valve operates a dump valve which opens to relieve fluid pressure on the larger piston area when the trigger valve recloses in response to reduction of fluid pressure from the solenoid valve.

3 Claims, 4 Drawing Figures

MODULATABLE POWER TRANSMISSION CLUTCH

BACKGROUND OF THE INVENTION

1. Field of Use

This invention relates generally to modulatable power transmission clutches and, in particular, to those wherein a fluid-applied spring-released piston operates on clutch plates disposed between a rotatable driving member and a rotatable driven member to effect clutch modulation.

2. Description of the Prior Art

U.S. Patent application Ser. No. 643,357, filed Dec. 22, 1975 to Schneider et al for "Swing Control for Crane", now U.S. Pat. No. 4,070,926, and assigned to the same assignee as the present application discloses a power transmission system for swinging the upper section of a mobile crane in opposite directions. That power transmission system employs a transmission having a pair of alternately actuatable "wet" type prior art transmission clutches therein. Each transmission clutch includes a rotatable driving member, a rotatable driven member, and slippingly engagable clutch plates between said members. Each clutch is modulatable between a minimum engaged position and a fully engaged position by means of application of pressurized hydraulic fluid from an operator-controlled proportional solenoid valve to a fluid-applied spring-released movable piston which is embodied in the clutch and acts upon the clutch plates. Such a clutch is modulatable by applying fluid at various pressures to the piston and is able, for example, with a clutch plate diameter of about 9 inches, to transmit dynamic torques in the range of 4500 to 8000 ft. lbs. and hold static torques equal to or up to 150% of that value. Such a clutch is designed so as to have enough friction material area in its clutch plates so as not to create thermal problems within the clutch and cause distress or failure.

SUMMARY OF THE PRESENT INVENTION

A modulatable power transmission clutch in accordance with the present invention is similar to the above-described prior art clutch in that it comprises a rotatable driving member, a rotatable driven member, slippingly engagable clutch plates between the members and fluid-applied spring-released movable piston for moving the plates from disengaged to fully engaged condition. In accordance with the invention, however, the piston has two separate fluid application areas, with one piston area being larger than the other (i.e., about 61 square inches for the larger and about 9 square inches for the smaller). Fluid is supplied directly to the smaller piston area by an operator-controlled proportional solenoid valve to regulate clutch modulation. Fluid flow to the larger piston area is controlled by a normally spring-biased closed trigger valve which pops open when fluid pressure to the smaller piston area reaches a predetermined level (about 200 psi, for example) to thereby effect maximum clutch engagement. The trigger valve operates a spring-biased closed dump valve within the clutch in such a manner that when the trigger valve opens, the dump valve is moved closed and when the trigger valve closes in response to reduction of fluid pressure from the solenoid valve, the dump valve opens to relieve fluid pressure on the larger piston area.

The proportional solenoid valve can be operated to apply pressurized fluid in a pressure range, for example, between 0 and about 200 psi to the smaller piston area to effect a high degree of regulation or control over modulation of the clutch by the operator. When fluid pressure on the smaller piston area exceeds about 200 psi, for example, the trigger valve opens and the dump valve closes to enable fluid at a pressure of about 200 psi or above, for example, to be applied to the larger piston area thereby maintaining full clutch engagement and maximum torque transmission therethrough. When fluid pressure is again reduced to a pressure range below the aforementioned 200 psi, for example, the trigger valve re-closes and the dump valve opens thereby releasing the clutch from maximum torque transmission condition and permitting the clutch to be modulatable between disengaged and fully engaged condition by application of fluid pressure to the smaller piston area by means of the solenoid valve.

A clutch in accordance with the present invention has all the advantages of a prior art clutch of the same general size and characteristics but, in addition, enables the operator to directly modulate the output torque within a range, for example, of from 0 lbs. ft. up to approximately 800 lbs. ft. of torque delivery. Since the clutch has two separate piston areas, with one of the areas being substantially larger than the other, pressurized fluid can be admitted to the smaller piston area at all times and produces normal forces to effect engagement of the clutch in proportion to the pressure of the fluid and the size of the small piston area. Such force must, however, be sufficient to overcome the countervailing force of the release spring which urges the piston away from the clutch plates before the clutch becomes engaged and any torque can be transmitted therethrough. Increase of forces above the countervailing spring force effects proportional engagement of the clutch and proportional torque delivery. Thus, the operator is able not only to modulate torque but to do so at relatively high pressures while achieving minute changes in torque at these high pressures. The trigger valve, which is normally spring-biased to closed position, is actuated to open position when fluid pressure applied to the smaller piston area exceeds a predetermined level to admit oil to the larger piston area. This results in a large increase in the force acting to engage the clutch and thereby provides a large increase in torque transmission capacity.

A clutch in accordance with the invention has a large capability for static torque transmission while still making possible very sensitive modulation of the torque from approximately 0 to 20% of clutch capacity. The clutch is also rapidly releasable or disengagable. Other objects and advantages of the invention will hereinafter appear.

DESCRIPTION OF A PREFERRED EMBODIMENT

Figure 1:
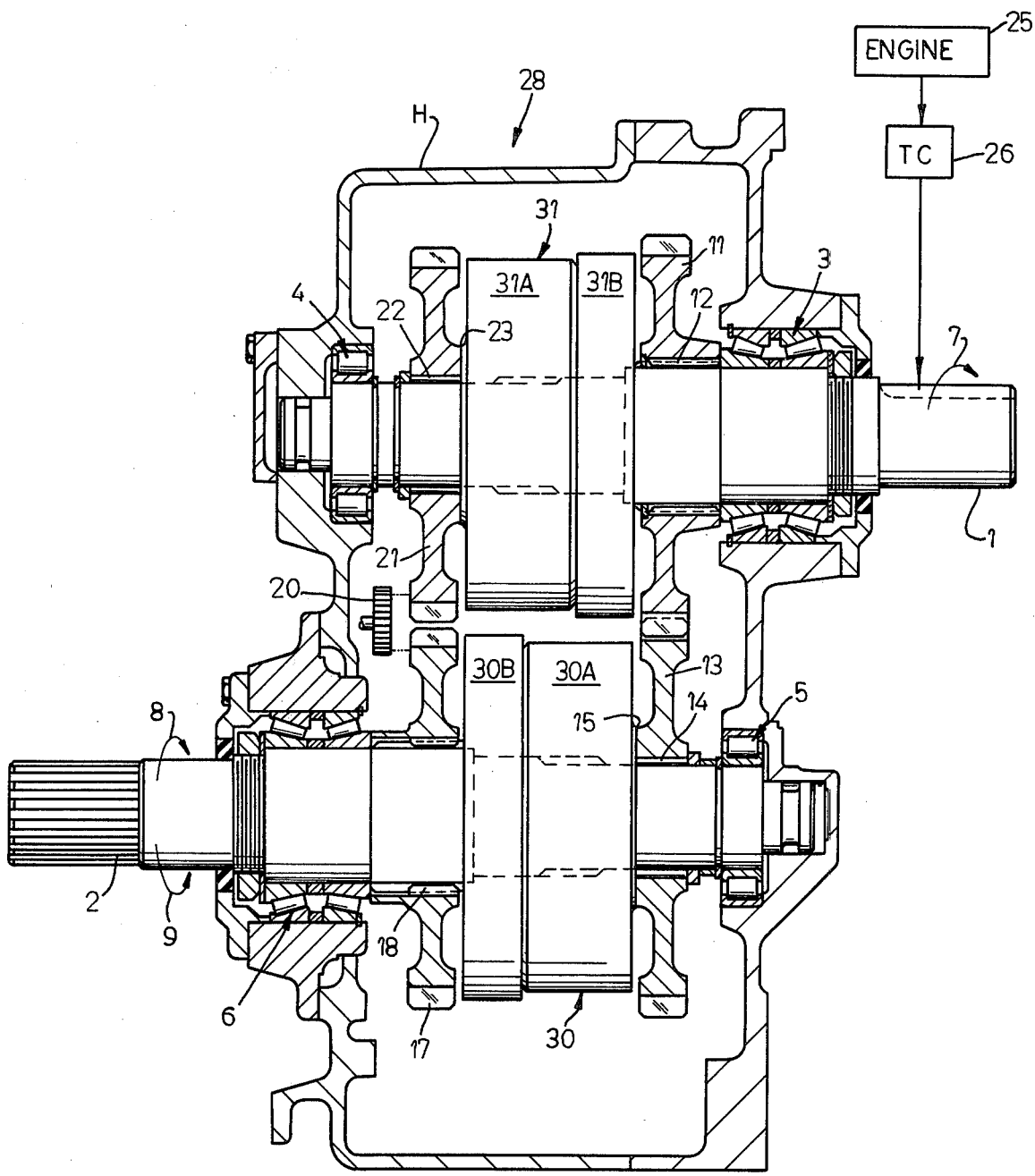
FIG. 1 is a view partly in cross section of a power transmission incorporating a pair of clutches in accordance with the invention.
Figure 2:
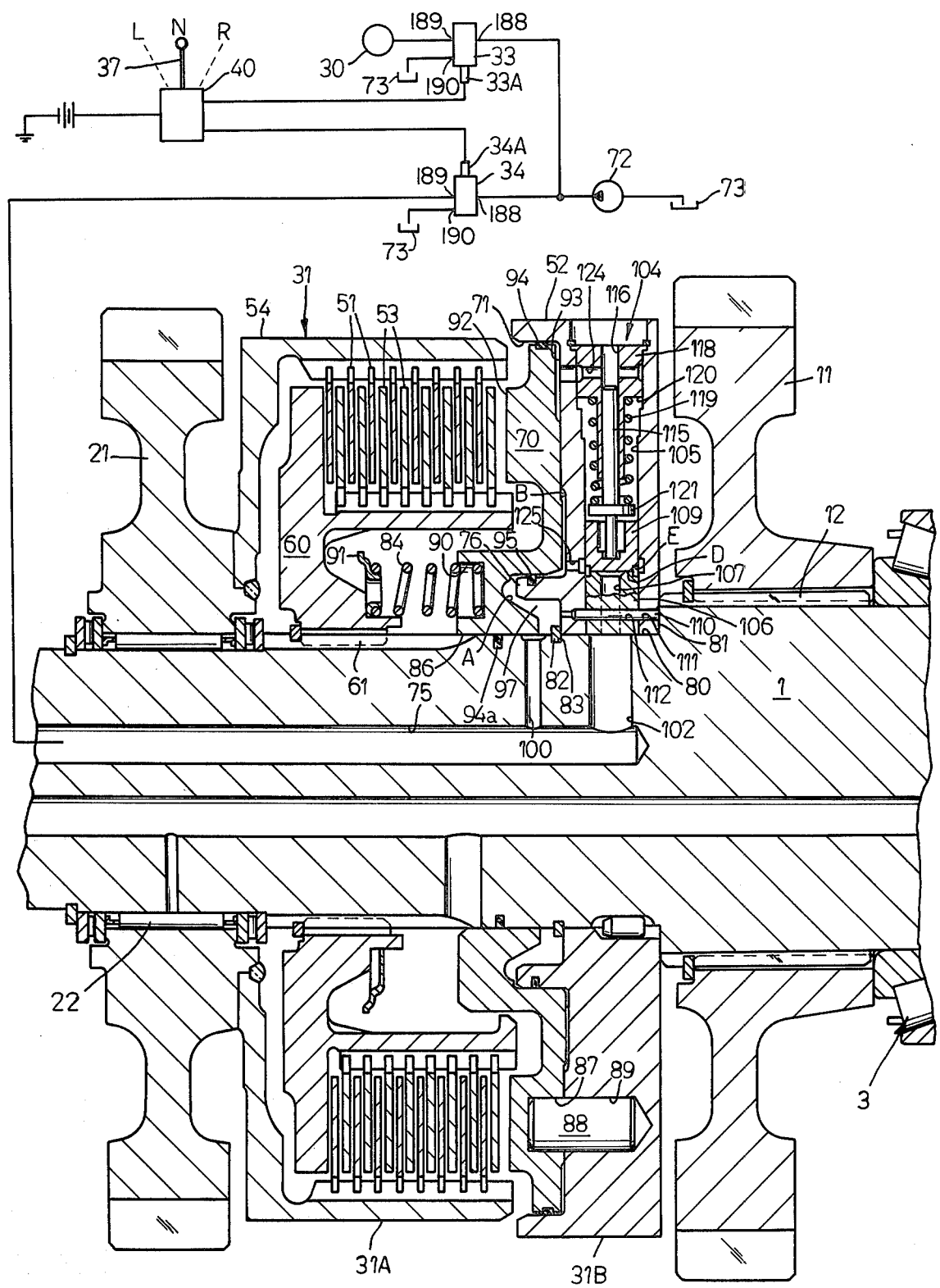
FIG. 2 is an enlarged cross-sectional view of one of the clutches shown in FIG. 1.

FIG. 1 shows a power transmission system including an engine 25, a torque converter 26, and a transmission 28 have modulatable right and left wet-type fluid-applied spring-released transmission clutches 30 and 31, respectively, in accordance with the invention. As FIG. 2 shows, each clutch 30 and 31 is modulated from non-engaged to a partially or fully engaged condition by means of pressurized hydraulic fluid which is supplied from a reservoir 73 by a pump 72 to normally closed proportional solenoid valves 33 and 34, respectively. The control valves 33 and 34 may take the form of similar valves shown in aforementioned patent application Ser. No. 643,357, issued Jan. 31, 1978 as U.S. Pat. No. 4,070,926, and are understood to have valve spools axially movable between a fully closed and fully open position by means of an electrically operated proportional solenoids 33A and 34A, respectively, which are energized by an electric current signal from a control unit 40, also described in aforementioned application Ser. No. 643,357, now U.S. Pat. No. 4,070,926, which has an operator's control lever 37 associated therewith. When control lever 37 is in neutral (shown in FIG. 2), the clutches 30 and 31 are disengaged. When the control lever 37 is moved from neutral toward the L or R positions, the solenoid valves 33 or 34, respectively, and the clutches 30 or 31, respectively, are operated. The amount of operating fluid metered by a valve 33, 34 to modulate its associated clutch 30, 31 is proportional to the electric current applied to the proportional solenoid valve and is a function of the throw of lever 37. FIG. 2 shows that the control valves 33 and 34 control the supply of hydraulic operating fluid to their respective clutches from pump 72. The two control valves are identical to each other in construction and mode of operation. In practice, each control valve could take the form of control valve 33 shown in FIGS. 9 and 10 of U.S. Pat. No. 4,070,926. Control valve 33 comprises a valve body 185 having an oil inlet port 188 which is connectable to pump 72, an oil outlet port 189 which is connectable to the clutch being controlled by the valve, and an outlet 190 which is connectable to the sump or reservoir 73.

As FIG. 1 shows, transmission 28 comprises a housing H for the transmission clutches 30 and 31 and into which a transmission input shaft 1 extends and from which a transmission output shaft 2 extends. Input shaft 1, which is mechanically connected to torque converter 26 and driven thereby in the direction of the arrow 7, is supported for rotation on housing H by roller bearing assemblies 3 and 4. Output shaft 2, which is rotatable either in the direction of arrow 8 or arrow 9, depending on whether clutch 30 or 31 is being modulated, is supported for rotation on housing H by roller bearing assemblies 5 and 6.

As FIG. 1 shows, a gear 11 is spline-connected at 12 to input shaft 1 and is in constant mesh with a gear 13 which is mounted for relative rotation on output shaft 2 by a roller bearing assembly 14. Clutch 30 has two relatively rotatable sections 30A and 30B and clutch 31 has two relatively rotatable sections 31A and 31B. Gear 13 is rigidly connected as by welding at 15 to section 30A of clutch 31. A gear 17 is spline-connected as at 18 to output shaft 2. Gear 17 is connected through an idler gear 20 to a gear 21 which is mounted for relative rotation on input shaft 1 by a roller bearing assembly 22. Gear 21 is rigidly connected as by welding at 23 to section 31A of clutch 31.

Each clutch 30 and 31 is modulatable between fully disengaged, through partially engaged to synchronization or lockup, whereafter it automatically sequences to full torque capability. When control lever 37 is in neutral, both clutches are fully disengaged. However, when control lever 37 is moved from neutral to either right or left (R or L), then clutch 30 or 31, respectively, will be modulated. Referring to FIG. 1, the power flow through transmission 28 is as follows. Assuming that input shaft 1 is rotating in the direction of arrow 7 and that neither clutch 30 nor 31 is actuated, output shaft 2 is stationary. Assuming that clutch 30 is engaged, power flows from input shaft 1, gear 11, gear 13, clutch section 30A, clutch section 30B, and output shaft 2, which rotates in the direction of arrow 9. Assuming that clutch 31 is engaged, power flows from input shaft 1, clutch section 31B, clutch section 31A, gear 21, gear 20, gear 17, and output shaft 2, which rotates in the direction of arrow 8.

FIG. 2 is an enlarged cross-sectional view of right transmission clutch 31 and shows the manner in which it is associated with gears 11 and 21 and input shaft 1. Since clutches 30 and 31 are substantially identical in construction, except that they are reversely mounted with respect to each other, only clutch 31 is hereinafter described in detail. Clutch 31 comprises a set of drive plates 53 and a set of driven plates 51. The driven plates 51 are spline-connected and axially slidable with respect to a hollow cylindrical housing 54 of clutch section 31A which is welded at 23 to gear 21. Thus, gear 21, housing 54, and the driven plates 51 rotate as a unit when clutch 31 is engaged. The drive plates 53 of clutch 31 are spline-connected and axially slidable with respect to a hub 60 and the hub in turn is spline-connected as at 61 to input shaft 1. The drive plates 53 are interposed between the driven plates 51 and are axially slidable on the hub 60 so that when the plates 51 are being driven as a result of frictional engagement with the drive plates 53, rotation of shaft 1 and hub 60 effects rotation of housing 54 and gear 21.

As FIG. 2 shows, means in accordance with the invention are provided in clutch 31 to force the drive plates 53 and the driven plates 51 into face-to-face engagement with a desired degree of force so that power (torque) may be transmitted therebetween proportional to the amount of pressure applied to force the plates together.

Such means comprise an annular piston 70 for cooperation with the clutch plates 51 and 53 and an annular piston housing 52, both of which are supportably mounted on and rotatable with shaft 1. Piston housing 52 which has a central opening 80 for receiving shaft 1 is secured in a fixed axial position on the shaft by entrapment between a shoulder 81 on the shaft and a snap-type retaining ring 82 which engages an annular groove 83 on the shaft. Piston 70 is axially slidable on shaft 1 as hereinafter explained, between the fully disengaged position shown in FIG. 2, wherein it is urged by means of a compression-type piston return spring 84 and other positions leftward of that shown in FIG. 2 wherein it engages the endmost clutch plate 53. Piston 70, which has a central opening 86 for receiving shaft 1, is provided with an opening 87 for receiving a dowel pin 88 which is mounted in an opening 89 on piston housing 52. The dowel pin 88 maintains piston 70 aligned with piston housing 52 as the piston moves axially. The piston return spring 84 has one end disposed in a recess 90 in the piston 70 and has its other end engaged with a spring retainer 91 which is mounted on clutch hub 60. The outer face of piston 70 is provided with an annular projection 92 for engagement with outermost clutch plate 53.

Piston 70 and piston housing 52 cooperate with each other to define two separate piston areas A and B on piston 70. Thus, piston housing 52 has a circumferential outer projection 71 and a concentrically arranged annular inner projection 76 which define a cavity or chamber 98 for receiving the larger outermost piston area B of piston 70. The inner annular projection 76 is spaced from shaft 1 and cooperates with piston 70 to define a smaller chamber 97 for inner piston area A on piston 70. Fluid-tight seals in the form of annular rings 94 and 95 are provided to seal the two separate piston areas and chambers from one another. For example, seal 94 is provided between the outer flange 71 of piston housing 52 and the outer circumferential edge of piston 70. Seal 95 is provided in a groove on inner projection 76 of piston housing 52 and engages the piston 70 to form a seal between the two piston areas A and B. In the embodiment shown, smaller piston area A is on the order of 9 sq. inches and outer piston area B is on the order of 61 sq. inches. A seal 95a is provided between shaft 1 and piston 70 to seal chamber 97.

An axial passage 75 is provided in shaft 1 for transmitting hydraulic fluid for operating piston 70 from solenoid valve 34. Passage 75 communicates through a radially extending passage 100 in shaft 1 with the chamber 97 in which smaller inner piston area A is located. Passage 75 also communicates through a radially extending passage 102 in shaft 1 with a valve assembly 104 hereinafter described in detail which supplies fluid to the chamber 93 for the larger outer piston area B of piston 70.

The valve assembly 104 is disposed in a cylindrical radially extending bore 105 in piston housing 52. Valve assembly 104 comprises a hollow cylindrical valve seat member 106 having a central passage 107 therethrough. The valve seat member 106 is engagable by a cylindrical trigger valve member 109 which is slidably mounted in bore 105 above valve seat member 106. The valve seat member 106 is secured in position against displacement by means of a dowel pin 110 which extends through an opening 111 in piston housing 52 and an opening 112 in the valve seat member 106. Trigger valve member 109 controls opening and closing of a fluid inlet to passage 125 between passage 75 and chamber 93 for larger piston area B. The valve assembly 104 also includes a dump valve member 115 which is axially slidable in a bore 116 in a dump valve sleeve 118 which is mounted in bore 105. Dump valve 115 is urged downwardly against trigger valve 109 by means of a compression spring 119 in bore 105 which bears against a flange 120 at the upper end of the dump valve sleeve 118 and a flange 121 near the lower end of the dump valve 115. The axial bore 116 in dump valve sleeve 118 communicates with the interior of clutch housing H which is understood to be filled with oil. The bore 116 is intersected by an exhaust passage 124 which communicates between the bore and the chamber 93 for the larger piston area B and serves as a fluid exhaust passage. When the dump valve 115 is spring-biased downwardly as shown in FIG. 2, the exhaust passage 124 is opened and trigger valve 109 is moved to a position wherein it effects closure of the fluid inlet passage 125 to the larger piston area B. When trigger valve 109 is moved upwardly in response to oil pressure in oil inlet passage 75, it moves the dump valve 115 upwardly against the force of spring 119 and causes the dump valve to close the fluid exhaust passage 124. The trigger valve 109 has a built-in hysteresis which makes it an astable valve. This function is accomplished by means of the two areas D and E at the face of the trigger valve 109. When the valve 109 is sealing as shown, the pressure works on area D, but as soon as valve 109 opens, the pressure works on areas D and E, creating a larger force to drive the valve full open.

OPERATION

Clutch 31 operates in the following manner and it is to be understood that clutch 30 operates in a similar manner when it is actuated. Movement of control lever 37 by the machine operator from the neutral position shown in FIG. 2 rightward toward position R causes opening of solenoid valve 34 in proportion to the amount of lever movement. Fluid is supplied under pressure by pump 72 from reservoir 73 through proportional valve 34 to passage 75. Pressurized fluid in passage 75 is supplied directly through passage 100 to chamber 97 and acts against the smaller inner piston area A, thereby causing leftward (with respect to FIG. 2) movement of piston 70 toward and against the clutch plates whenever the fluid pressure is sufficient to overcome the opposing force of piston return spring 84. When the opposing force of spring 84 is overcome, piston 70 can be moved against the clutch plates in response to the manipulation of the operator's control lever 37. Thus, the clutch 31 can be modulated. In accordance with the invention, when lever 37 operates valve 34 so that fluid pressure in passage 75 exceeds a predetermined value, the force of the fluid pressure acting on trigger valve 109 causes the latter to pop upwardly to open position thereby opening fluid passage 125 and permitting fluid at the predetermined pressure level to be applied to the larger outer piston area B. As trigger valve 109 moves upwardly, it also effects upward movement of dump valve 115 to a position wherein it effects closure of fluid exhaust passage 124. In order for trigger valve 109 and dump valve 115 to move upwardly, the predetermined fluid pressure being applied to trigger valve 109 must be sufficient to overcome the biasing action of spring 119. Since exhaust passage 124 is closed and fluid inlet passage 125 is open, full pressure is exerted by piston 70 against the clutch plates and this pressure is the sum of the forces produced by both the smaller and larger piston areas. When control lever 37 is returned toward neutral, and fluid control valve 34 reduces fluid flow pressure in passage 75, trigger valve 109 is able to close and dump valve 115 is able to open under the force of spring 119. As this occurs, fluid is dumped from the larger outer fluid application area of piston 70 through the exhaust passage 124, and clutch operation is again determined by fluid flow to the smaller piston area A.

Clutch 31 includes all of the normal functions of a wet powershift transmission clutch of comparable size and in accordance with the invention includes features that give the operator ability to use it in the same manner as prior art type dry master clutches in vehicles.

Assuming that clutch 31 is an 8-plate 9 inch diameter wet clutch, it normally functions when placed in a powershift transmission to transmit dynamic torques in the range of 4500 to 8000 ft. lbs. and to hold static torques when synchronized equal to that value or up to 150% of that value. Another typical function of a clutch of this size is to have enough friction material area so that synchronizations of devices normally made by use of this clutch will not create thermal problems within the clutch and cause distress or failure. In these respects, clutch 31 is equal to all other clutches of this size and friction plate area.

Clutch 31 also has the ability, for example, to modulate output torque under direct control of the operator's apply pressure in the range of 0 lbs. ft. up to approximately 800 lbs. ft. of torque delivery. Clutch 31 makes this possible through the use of the two separate internal fluid application piston areas A and B. Since the inner piston consists of a small area of only 9 square inches, oil pressure admitted to this piston area can create normal forces to engage the clutch in proportion to the oil pressure and this area of the piston. Since the force of the release spring 84 totals approximately 300 lbs. disengaging force, the pressure in the small piston area A must equal or exceed 35 psi before any initial clutch torque is transmitted. The pressure on small piston area A can then be escalated from 35 to 200 psi with proportional changes in the normal force creating various amounts of torque. At 200 psi of fluid pressure, for example, a normal force equal to a dynamic capability of approximately 800 lbs. ft. of torque is achieved. Thus with this construction, the operator may not only modulate torque, but can do so at relatively high fluid application pressures where he has definitive control over minute changes in torque, since such torque changes require large changes in fluid pressure to achieve.

During operation in accordance with the previous paragraph, the fluid applied to the smaller piston area A is also pushing upward on trigger valve 109. Valve 109 is held down (closed) by the dump valve compression spring 119 reacting against the dump valve sleeve 118. The spring 119 is so designed as to hold the trigger valve closed and not admit oil to the outer piston area until, for example, 200 psi of fluid pressure is exceeded. When the oil pressure exceeds 200 psi, the trigger valve 109 comes off of its seat 106 and admits oil through passage 125 against the larger outer piston area B. Simultaneously, trigger valve 109 snaps upwardly without regulation and moves dump valve 115 upward to close off the exhaust passage 124 from the outer piston area B. With exhaust passage 124 closed, the chamber 93 for larger piston area B fills up with fluid and provides a large increase in normal force acting on the clutch plates and therefore effects a large change in torque capacity. With a fill pressure of approximately 250 psi being applied on the total clutch, both the inner smaller piston area A and the outer larger piston area B have a combined static pressure of 250 psi to create normal force to apply the clutch. In addition to this, of course, there are centrifugal head pressures attained in each piston housing chamber 93 and 97 equal to the rotational speed of the piston housing 52 which also tends to create additional normal clutch force.

Clutch 31 has a large capability for static torque transmission and for dynamic capability and still makes available very sensitive modulation of torques from approximately 0 to 20% of clutch capacity. The release times of the clutch are quite fast, since the fluid from outer piston chamber dumps through the dump valve exhaust passage 124. When oil pressure is reduced dump valve 115 assumes the down position (shown in FIG. 2), and a large flow path is available for exit of the fluid from the outer piston area B. The small piston area A is never exhausted through dump valve 124. Thus, lowering of oil pressure to under 35 psi allows the clutch 31 to release by itself since the force of spring 84 is in excess of apply pressures under the value of 35 psi, for example. Centrifugal heads generated by oil acting on the smaller piston area A are negligible at speeds up to 3000 to 4000 RPM.

Figure 3:
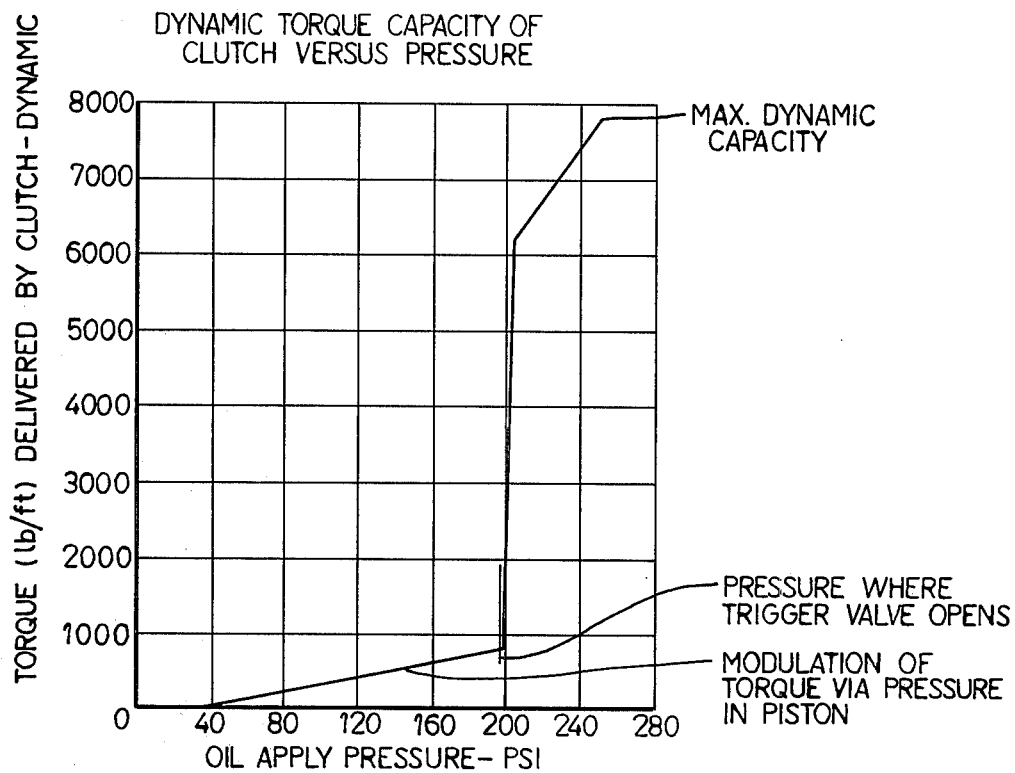
FIG. 3 is a graph depicting the relationship between oil pressure applied to operate the clutch shown in FIG. 2 and the torque delivered by that clutch.

Referring to the graph in FIG. 3, the torque output of clutch 31 versus operator controlled oil apply pressure into the clutch is shown graphically. As the graph shows, clutch 31 provides for very high fluid pressure with a limited torque available during modulation. If the clutch 31 were designed to modulate at torques up to 3000 or 4000 ft. lbs., instead of only 800 ft. lbs., as disclosed herein, the horsepower capability that the operator would control during slipping would probably be considerably beyond the thermal capability of this area of the clutch plates of the clutch disclosed herein. Typical applications of clutch 31 are in various machines that need gentle torque manipulation of the driven device. These would include sensitive swing devices on cranes, inching movements on farm tractors or other vehicles and transmissions that need direct relationship from the operator handle control to the sensitivity of the torque output at these low levels. Once the predetermined pressure level of 200 psi (800 lb. ft.) capacity, for example, has been exceeded, the trigger valve 109 and dump valve 115 force the clutch 31 to a very high capability whereby it can then provide torques to synchronize the clutch and prevent high horsepower usage continually and thus thermal failure.

Figure 4:
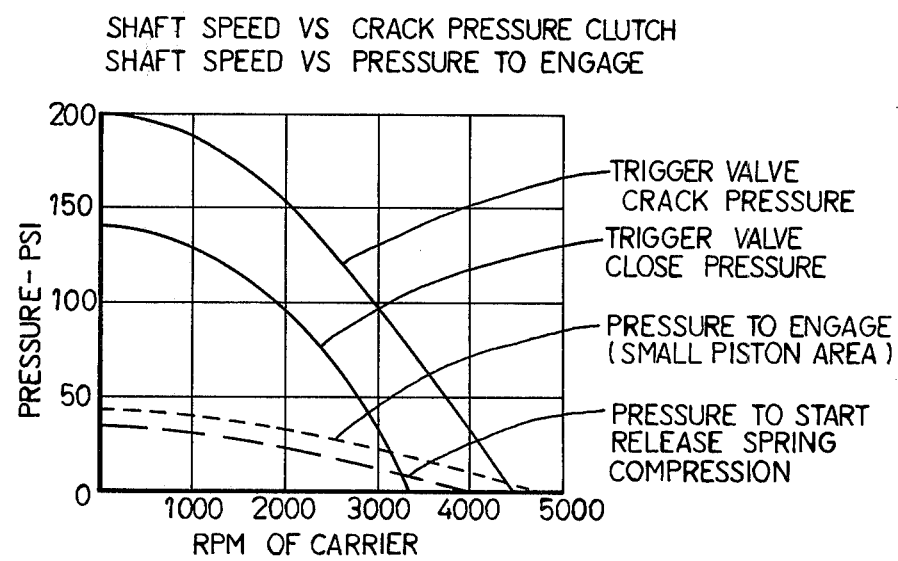
FIG. 4 is a graph depicting the relationship between the oil pressure required to operate the clutch and the output rotation speed of the clutch.

As the graph in FIG. 4 makes clear, since the trigger valve 109 and dump valve 115 are spring loaded, any carrier or housing 54 that rotates develops an outward centrifugal force due to their weight that opposes the downward force of spring 119. This force tends to lower the crack pressure (200 psi, for example) when the speeds in the carrier increase. While the weights of the valves 109 and 115 can be arbitrarily made heavier or lighter, those employed in an actual embodiment were designed to allow operation up to 4500 RPM. At this point, clutch 31 would centrifugally open the trigger valve 109 for admittance of oil pressures all the way down to 0 psi and thus could not be controllable for purposes as previously described. Typical applications of clutch 31 and its rotative speed are in the area of 500 RPM to 2000 RPM where crack pressures are still in the usable values of 200 psi down to 160 psi. See FIG. 4.

Clutch 31 may be modified and applied in ways other than shown in the drawings. For example, by sizing fluid inlet hole 125 to orifice into the outer piston area B a given quantity of oil when opened by the trigger valve 109 when it is moved at 200 psi, the effect would be to time the filling of the chamber 93 for the outer piston B and thus attain the high dynamic capability over a longer period of time giving in effect a modulated increase, for example, from the 800 ft. pounds up to the 4000 to 6000 ft. lb. range. This would be advantageous in certain transmission applications.

It is also possible, for example, to tie in two clutches 31, if embodied in one single carrier back-to-back in a dual design, so that the pressure from the larger piston area B on one clutch is transmitted through the carrier to the vented area containing the dump valve 115 in the other clutch. This would provide absolute control over the two clutches so that, while one clutch had pressure in the outer piston, the other one could not be supplied with any pressure against its larger piston area B. This is an advantage in that it internally guarantees against the inadvertent application of two clutches simultaneously in a transmission.

We claim:

1. In a modulatable power transmission clutch:
a fluid operated movable piston for effecting clutch operation and having separate fluid application piston areas thereon, one of said piston areas being adapted to have fluid flow directed thereto at a variable fluid pressure whereby said clutch is modulatable, the other of said piston areas being adapted to have fluid flow directed thereto to effect maximum and unmodulatable engagement of said clutch;
and valve means for controlling fluid flow to said other of said piston areas in response to fluid pressure at said one of said piston areas, said valve means including a normally closed first valve which opens fully to permit fluid flow to said other piston area when fluid pressure at said one piston area exceeds a predetermined value and re-closes when said pressure falls below said predetermined value, said valve means further including a normally open second valve actuatable to closed position by movement of said first valve to open position which closes fully to prevent fluid flow from said other piston area when said first valve opens and which re-opens fully to permit fluid flow from said other piston area when said first valve re-closes fully, said valve means also including spring means for biasing said first valve to closed position and said second valve to open position, said first valve including a surface area against which fluid pressure acts which increases in size when said first valve opens to thereby increase the force with which said first valve moves to fully open position.

2. A modulatable power transmission clutch comprising:
a rotatable driving member;
a rotatable driven member;
slippingly engagable friction clutch means between said members for establishing a drive connection therebetween;
a movable piston for causing variable engagement of said friction clutch means;
said piston having two separate fluid application areas;
first means for applying a fluid at variable pressure to one of said fluid application areas of said piston to cause variable engagement of said friction clutch means and enable modulation of said clutch, and second means including first valve means responsive to fluid pressure at said one fluid application area exceeding a predetermined pressure to open fully for applying fluid to the other of said fluid application areas of said piston to increase the engagement of said friction clutch means to maximum and unmodulatable engagement, said second means further including second valve means which opens fully for releasing fluid pressure from said other fluid application area when said fluid pressure applied to said one fluid application area decreases below said predetermined pressure and said first valve means re-closes fully, said first valve including a surface area against which fluid pressure acts which increases in size when said first valve opens to thereby increase the force with which said first valve moves to fully open position.

3. A modulatable power transmission clutch comprising:
a rotatable driving member;
a rotatable driven member;
slippingly engagable friction clutch means between said members for establishing a drive connection therebetween;
a movable piston for causing variable engagement of said firction clutch means;
said piston having two separate fluid application areas, with one area being smaller than the other;
first means including a passage for applying fluid at variable pressure to said one fluid application area of said piston to cause variable engagement of said friction clutch means and enable modulation of said clutch, and second means responsive to fluid pressure at said one fluid application area for applying fluid to said other fluid application area of said piston to increase the engagement of said friction clutch means to maximum and unmodulatable engagement when said fluid pressure applied to said one fluid application area reaches a predetermined pressure, and for releasing fluid pressure from said other fluid application area when said fluid pressure applied to said one fluid application area decreases below said predetermined pressure,
said second means including a normally closed trigger valve which opens fully at said predetermined pressure to connect said other piston area to said passage and a normally open dump valve which closes fully to prevent fluid flow from said other fluid area when said trigger valve opens, said first valve including a surface area against which fluid pressure acts which increases in size when said first valve opens to thereby increase the force with which said first valve moves to fully open position.

* * * * *